United States Patent
Miyauchi et al.

(10) Patent No.: US 7,576,021 B2
(45) Date of Patent: Aug. 18, 2009

(54) MOTHER GLASS COMPOSITION FOR GRADED INDEX LENS, GRADED INDEX LENS, MANUFACTURING METHOD OF GRADED INDEX LENS, OPTICAL PRODUCT AND OPTICAL INSTRUMENT USING THE SAME

(75) Inventors: Taro Miyauchi, Tokyo (JP); Kazuya Ohkawa, Tokyo (JP); Tatsufumi Shiba, Tokyo (JP); Tomizou Matsuyama, Tokyo (JP)

(73) Assignee: Nippon Sheet Glass Co., Ltd., Tokyo (JP)

( * ) Notice: Subject to any disclaimer, the term of this patent is extended or adjusted under 35 U.S.C. 154(b) by 657 days.

(21) Appl. No.: 11/098,400

(22) Filed: Apr. 5, 2005

(65) Prior Publication Data

US 2005/0231815 A1    Oct. 20, 2005

(30) Foreign Application Priority Data

Apr. 5, 2004    (JP) .......................... P2004-110769

(51) Int. Cl.
*C03C 3/078* (2006.01)

(52) U.S. Cl. ............................. 501/72; 501/55; 501/63; 501/64; 501/65; 501/66; 501/67; 65/30.13

(58) Field of Classification Search ................... 501/55, 501/63, 64, 65, 66, 67, 72; 65/30.13
See application file for complete search history.

(56) References Cited

U.S. PATENT DOCUMENTS

| | | | |
|---|---|---|---|
| 6,268,304 B1 * | 7/2001 | Maeda et al. ................. 501/65 |
| 6,348,425 B1 * | 2/2002 | Barattini et al. ............... 501/5 |
| 6,387,510 B1 * | 5/2002 | Nakashima et al. .......... 428/426 |
| 6,476,975 B1 * | 11/2002 | Yoshii et al. ................. 359/652 |
| 6,764,972 B2 * | 7/2004 | Yoshii et al. .................. 501/63 |
| 2002/0065186 A1 * | 5/2002 | Yoshii et al. .................. 501/63 |
| 2008/0213495 A1 * | 9/2008 | Miyauchi et al. .......... 427/443.2 |

FOREIGN PATENT DOCUMENTS

| | | |
|---|---|---|
| JP | 57-95848 A | 6/1982 |
| JP | 62-12635 A | 1/1987 |
| JP | 63-64941 A | 3/1988 |
| JP | 63-170247 A | 7/1988 |
| JP | 9-48632 A | 2/1997 |
| JP | 2001-139341 A | 5/2001 |
| JP | 2002-211947 A | 7/2002 |
| JP | 2002-318302 A | 10/2002 |

OTHER PUBLICATIONS

Japanese Office Action dated Jan. 10, 2007.

* cited by examiner

*Primary Examiner*—Karl E Group
*Assistant Examiner*—Elizabeth A Bolden
(74) *Attorney, Agent, or Firm*—Sughrue Mion, PLLC (57) ABSTRACT

A mother glass composition for graded index lenses, comprising the following glass components in mol %: $40 \leq SiO_2 \leq 65$, $1 \leq TiO_2 \leq 10$, $0 \leq MgO \leq 22$, $2 \leq Li_2O \leq 18$, $2 \leq Na_2O \leq 20$, $6 \leq Li_2O+Na_2O \leq 38$, and from 0.1 to 15 mol % of any two or more of CaO, SrO and BaO, a graded index lens using the mother glass composition, a manufacturing method of the graded index lens, and an optical product and an optical instrument using the graded index lens, are provided.

13 Claims, 3 Drawing Sheets

MOTHER GLASS COMPOSITION FOR GRADED INDEX LENS, GRADED INDEX LENS, MANUFACTURING METHOD OF GRADED INDEX LENS, OPTICAL PRODUCT AND OPTICAL INSTRUMENT USING THE SAME

FIELD OF THE INVENTION

The present invention relates to a mother glass composition for a graded index lens that does not contain lead and suited for the manufacture of a high quality graded index lens. The invention further relates to a graded index lens using the mother glass composition for a graded index lens, and a manufacturing method of the same. The invention still further relates to an optical product and an optical instrument equipped with the graded index lens.

BACKGROUND OF INVENTION

A graded index lens is a rod-like lens or a fibrous lens having such refractive index distribution in its cross section that the refractive index varies from the center toward the periphery. The refractive index is ideally expressed by the following equation:

$$n(r)=n_c(1-Ar^2/2)$$

wherein $n_c$ is a central refractive index of an optical axis of lens, A is a refractive index distribution constant, and r is a distance from the center toward the radius.

A graded index lens has characteristics capable of forming an image even when both sides are flat, so that it can be easily manufactured as a small lens typified by micro-fine lens and widely used as optical components.

A rod lens array of graded index lenses set in array can cover a great size image by superimposing erect real images (1:1) from individual lenses. The rod lens array also has such an advantage that the processing of lens ends can be done by plane polishing. Due to these advantages, graded index lenses are used as image-forming optical components in a broad range of applications, e.g., copiers, facsimiles, LED printers, liquid crystal shutter printers and multi-functional printers. Graded index lenses are also used as lenses for communication.

Figure 1:
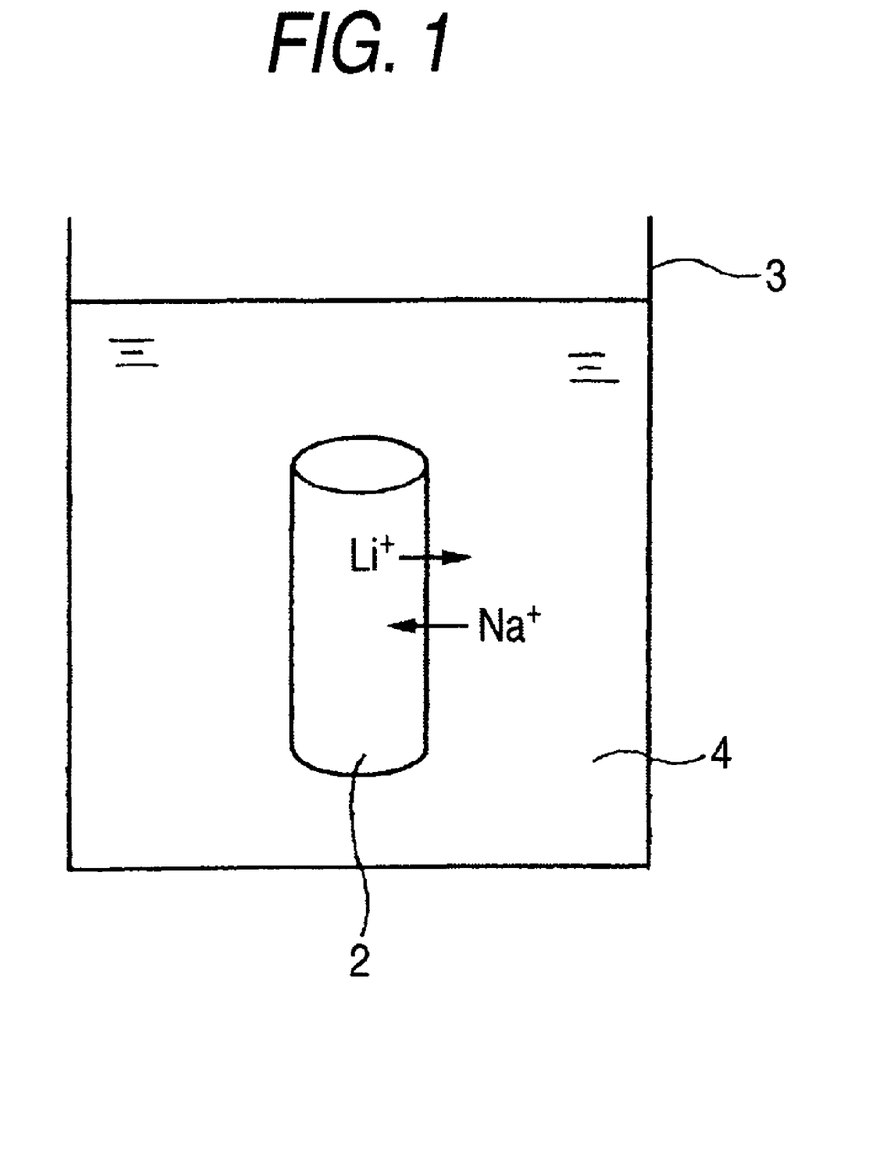
FIG. 1 is a drawing explaining an ion-exchange process in the manufacture of a graded index lens.

These graded index lenses can be manufactured by, e.g., an ion exchange process. As shown in FIG. 1, an ion exchange process is a process in which a glass body 2 containing a first cation (e.g., Li$^+$) capable of constituting a modifying oxide is brought into contact at a high temperature with a molten salt 4 containing a second cation (e.g., Na$^+$) capable of constituting a modifying oxide to exchange the first cation in the glass body for the second cation in the molten salt. Reference numeral 3 indicates an ion exchange tank.

Figure 2:
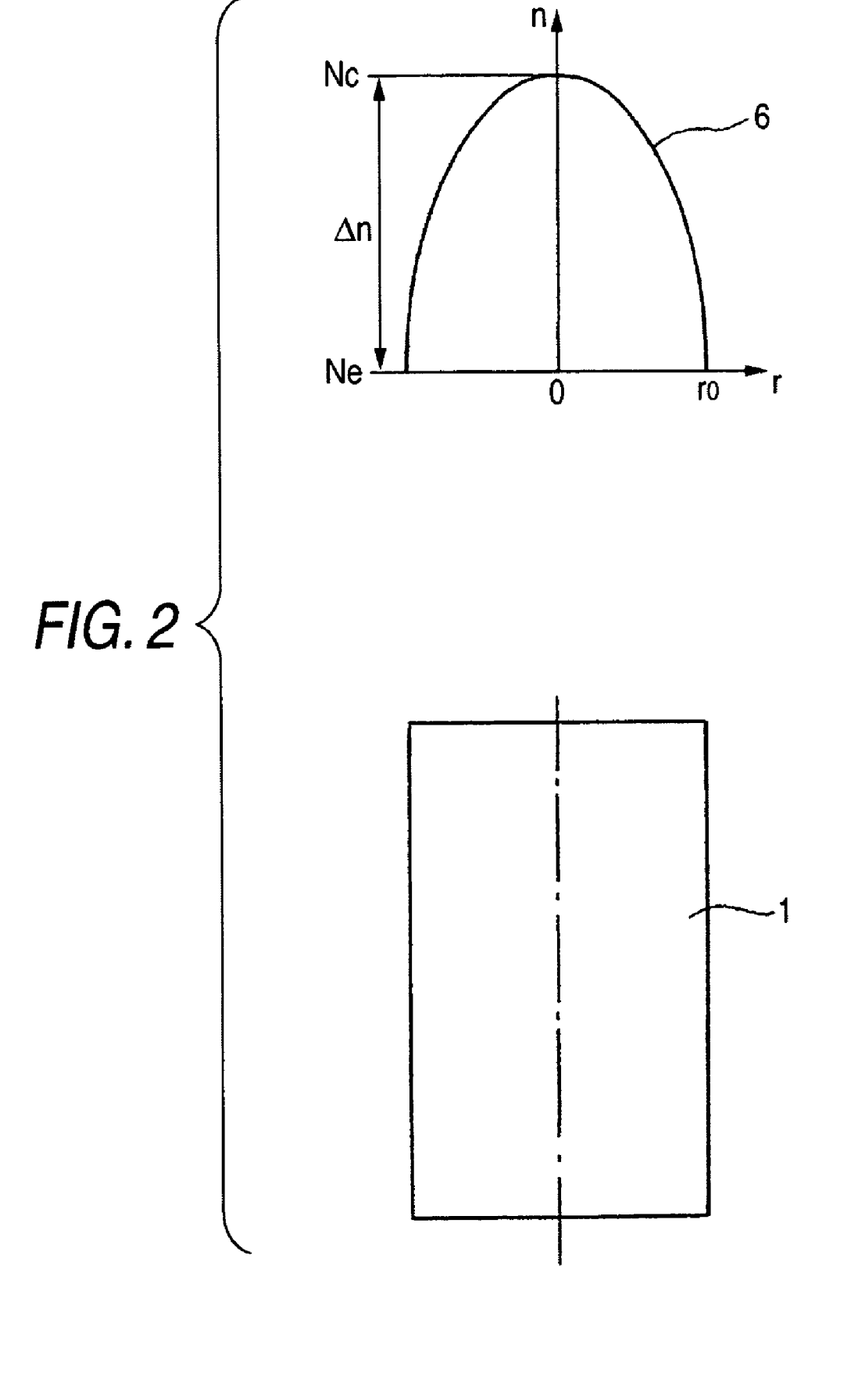
FIG. 2 is a drawing explaining a graded index lens.

The distribution of the first cation and the second cation in the glass rod can be changed by the ion exchange. By the distribution of ion concentrations in the glass rod, the refractive index of the glass rod can be changed from the center thereof toward the periphery, by which a graded index lens can be manufactured (refer to FIG. 2). Further, reference numeral 6 is a refractive index distribution curve, which indicates the refractive index at the position toward the periphery. Sign r is the distance from the center toward the radius, 0 is the center of an optical axis of lens, r0 is a radius, Nc is the refractive index of the central part of lens, and Ne is the refractive index of the peripheral part of lens.

JP-B-51-21594 (the term "JP-B" as used herein means an "examined Japanese patent publication") discloses a graded index lens excellent in chromatic aberration obtained by ion exchange of glass body containing Cs in a potassium nitrate molten salt.

JP-B-59-41934 discloses a glass composition containing Li$_2$O and Na$_2$O as the glass composition for graded index lens, and a method of manufacturing a graded index lens having a greater angular aperture using the composition.

JP-B-7-88234 discloses a graded index lens having an angular aperture of 13° or greater and an area rate of effective field of view of 90% or higher made from a glass composition containing Li$_2$O and Na$_2$O in the molar ratio of Li$_2$O/Na$_2$O of from 1.25 to 1.5.

Lead-free lenses are required for the consideration of environmental protection. In particular in Europe, the use of lead is inhibited by the regulations such as "instruction on used electric and electronic equipments (WEEE)" and "order on the use prohibition against harmful substances (RoHS)".

Therefore, mother glass compositions for a graded index lens not containing lead oxide is disclosed in JP-A-2001-139341 (the term "JP-A" as used herein refers to an "unexamined published Japanese patent application"), JP-A-2002-121048, JP-A-2002-211947 and JP-A-2002-284543.

In conventional lead-free graded index lenses, the amount of Li is increased not to use lead. The reason for this is that lead is a necessary component to increase the angular aperture of a lens, so that a great amount of Li, which has also the effect of widening the angular aperture, must be used in place of lead to do away with lead. Further, to obtain characteristics as lens, it is necessary to maintain the ratio of Li and Na in a specific range, so that when the amount of Li is increased it is also necessary to increase the amount of Na.

The mobility of alkali ions is influenced by glass matrix (Si, Ti, Ba, Sr, etc.), alkali concentration and the ratio of each alkali concentration. In general, when the concentration of alkali increases, the glass matrix amount decreases by that part, as a result the skeletal parts of the glass become sparse, which results in the structure that the alkali ions are susceptible to mobility, so that the alkali ion mobility increases. Accordingly, when the concentration of Li becomes high, the total alkali concentration becomes high, and the alkali ion mobility increases.

When alkali mobility is excessively great, the following problems occur.

(1) Weather Fastness is Low.

Alkali ions make stains or corrosion by reacting with counter-anions such as carbonates.

Since alkali ions easily move, stain is liable to occur even at room temperature, which results in the deterioration of quality.

(2) Strength is Low.

In forming the gradient of composition from the center toward the sides of lens by ion exchange, there arises the difference in thermal expansion coefficient between the central part and the side parts due to the gradient of the composition. As a result, distortion occurs in the lens after ion exchange processing, or a residual stress is caused in the lens, by which cracks develop, so that the strength of the lens lowers. When the temperature in ion exchange processing is increased, the viscosity of the glass lowers at the time of ion exchange, and so the occurrence of distortion or a residual stress is restrained by the structural relaxation of the glass itself. On the other hand, when the temperature increases, the moving speed of ions becomes faster and ion exchange progresses too rapid, so that it is difficult to regulate ion exchange and a high quality lens having high reproducibility cannot be manufactured. Accordingly, for manufacturing a high quality lens, it is necessary to lower the ion exchange temperature to the glass transition point or lower, however, which results in the reduction of the strength of lens. A method to reinforce the surface of lens after ion exchange process for the improvement of the strength of lens is known, but such a method takes much time and raises the costs.

(3) The Reproducibility of an Angular Aperture is Lost.

Since ions easily move, the dispersion of quality is liable to occur at the time of ion exchange process. Therefore, high quality lenses cannot be stably obtained.

In addition to the above problems derived from the increase of alkali ion mobility, conventional lead-free graded index lenses have the following drawbacks.

(4) Crystallization is Easily Generated at the Time of Spinning (A Tendency to be Devitrified).

This is attributable to the fact that a great amount of Li is used, for example, the cause is the formation of the crystals of Ba—Ti—O and the like.

(5) The Chromatic Aberration of Lens is Great.

This results from the inappropriate amount of TiO.

(6) The Efficiency of the Formation of Refractive Index Distribution is Low.

This is attributable to the fact that the efficiency of ion exchange is bad. As a result, a large quantity of Li becomes necessary for the lens formation, which results in the above problems (1) to (4) and, at the same time, the increase of the costs.

(7) Temperature Dependency of Viscosity is Great.

The temperature dependency of viscosity depends upon the composition. When the temperature dependency of viscosity is great, dispersion is liable to occur in the performance of lens. Accordingly, the problem described in the above (3) is apt to occur.

SUMMARY OF THE INVENTION

The objects of the invention are to provide a graded index lens containing no lead, controlled in alkali ion mobility and high in quality, and provide a method of manufacturing the graded index lens.

Further objects of the invention are to provide a mother glass composition for graded index lens which is used for the graded index lens, and provide an optical product and an optical instrument equipped with the graded index lens using the mother glass composition.

The present invention is as follows.

(1) A mother glass composition for graded index lenses, which comprises the following glass components in mol %:
$40 \leq SiO_2 \leq 65$,
$1 \leq TiO_2 \leq 10$,
$0 \leq MgO \leq 22$,
$2 \leq Li_2O \leq 18$,
$2 \leq Na_2O \leq 20$,
$6 \leq Li_2O + Na_2O \leq 38$, and $0.1 \leq$ any two or more of CaO, SrO and BaO $\leq 15$ mol %.

(2) The mother glass composition for graded index lenses as described in the above item (1), wherein the content of $Li_2O$ is 2 mol % or more and less than 12 mol % and the total content of $Li_2O$ and $Na_2O$ is 6 mol % or more and less than 32 mol %.

(3) The mother glass composition for graded index lenses as described in the above item (1), wherein the glass components comprise in mol %:
$0 \leq B_2O_3 \leq 20$,
$2 \leq MgO \leq 22$,
$0 \leq CaO \leq 15$,
$0.1 \leq SrO \leq 15$,
$0.1 \leq BaO \leq 15$,
$2 \leq CaO + SrO + BaO \leq 25$,
$5 \leq MgO + CaO + SrO + BaO \leq 47$,
$2 \leq Li_2O \leq 12$,
$2 \leq Na_2O \leq 15$,
$6 \leq Li_2O + Na_2O < 27$,
$41 \leq SiO_2 + TiO_2 + B_2O_3 + Al_2O_3 \leq 70$,
$0 \leq ZnO \leq 10$,
$0 \leq Y_2O_3 \leq 5$,
$0 \leq ZrO_2 \leq 2$, and
$0 \leq ZnO + Y_2O_3 + ZrO_2 + Nb_2O_5 + In_2O_3 + La_2O_3 + Ta_2O_5 \leq 15$.

(4) The mother glass composition for graded index lenses as described in the above item (1), wherein the glass components comprise in mol %:
$0 \leq B_2O_3 \leq 10$,
$2 \leq MgO \leq 16$,
$0 \leq CaO \leq 15$,
$2 \leq SrO \leq 12$,
$2 \leq BaO \leq 12$,
$4 \leq CaO + SrO + BaO \leq 20$,
$5 \leq MgO + CaO + SrO + BaO \leq 36$,
$5 \leq Li_2O < 12$,
$5 \leq Na_2O \leq 15$,
$10 \leq Li_2O + Na_2O < 27$,
$0 \leq K_2O \leq 3$,
$0 \leq Cs_2O \leq 3$,
$0.7 \leq Li_2O/Na_2O \leq 2$,
$50 \leq SiO_2 + TiO_2 + B_2O_3 + Al_2O_3 \leq 70$,
$0 \leq ZnO \leq 8$,
$0 \leq Y_2O_3 \leq 5$,
$0.2 \leq ZrO_2 \leq 2$, and
$0.2 \leq ZnO + Y_2O_3 + ZrO_2 + Nb_2O_5 + In_2O_3 + La_2O_3 + Ta_2O_5 \leq 10$.

(5) The mother glass composition for graded index lenses as described in the above item (1), wherein the glass components comprise in mol %:
$2 \leq TiO_2 \leq 8$,
$0 \leq B_2O_3 \leq 10$,
$2 \leq MgO \leq 16$,
$0 \leq CaO \leq 15$,
$2 \leq SrO \leq 12$,
$2 \leq BaO \leq 12$,
$4 \leq CaO + SrO + BaO \leq 20$,
$5 \leq MgO + CaO + SrO + BaO \leq 36$,
$5 \leq Li_2O < 12$,
$5 \leq Na_2O \leq 15$
$10 \leq Li_2O + Na_2O < 27$,
$0 \leq K_2O \leq 3$,
$0 \leq Cs_2O \leq 3$,
$0.7 \leq Li_2O/Na_2O \leq 2$,
$50 \leq SiO_2 + TiO_2 + B_2O_3 + Al_2O_3 \leq 70$,
$0 \leq ZnO \leq 8$,
$0 \leq Y_2O_3 \leq 5$,
$0.2 \leq ZrO_2 \leq 2$, and
$0.2 \leq ZnO + Y_2O_3 + ZrO_2 + Nb_2O_5 + In_2O_3 + La_2O_3 + Ta_2O_5 \leq 10$.

(6) The mother glass composition for graded index lenses as described in any of the above items (3) to (5), wherein the content of $B_2O_3$ is from 1 to 10 mol %.

(7) The mother glass composition for graded index lenses as described in any of the above items (1) to (6), wherein any two or more of CaO/(CaO+SrO+BaO), SrO/(CaO+SrO+BaO) and BaO/(CaO+SrO+BaO) are 0.1 or more.

(8) The mother glass composition for graded index lenses as described in any of the above items (1) to (6), wherein any two or more of CaO/(CaO+SrO+BaO), SrO/(CaO+SrO+BaO) and BaO/(CaO+SrO+BaO) are 0.2 or more.

(9) A graded index lens, wherein a refractive index distribution is formed by ion-exchange process, and the graded index lens comprises the glass components as described in any of the above items (1) to (8).

(10) A manufacturing method of a graded index lens, which comprises: immersing a glass rod containing a first alkali metal in a molten salt containing a second alkali metal that is different from the first alkali metal; and ion-exchanging the first alkali ion for the second alkali ion to thereby form a refractive index distribution in the glass rod, wherein the glass rod comprises the glass components as described in any of the above items (1) to (8).

(11) The graded index lens as described in the above item (9), wherein a means for exclusion of a noise light is provided.

(12) An optical product comprising the graded index lens as described in the above item (9) or (11).

(13) An optical instrument comprising the optical product as described in the above item (12).

Ba, Sr, Ca and Mg are effective to lessen the mobility of alkali ions in this order.

In the mother glass composition for graded index lenses, the mobility of alkali ions can be adjusted by regulating the constitution of the glass components and, in particular, specifying the amounts of BaO, SrO and CaO. By certainly containing any two of BaO, SrO and CaO, proper mobility of alkali ions can be obtained in ion exchange and devitrification can also be inhibited. Further, by reducing the amount of $Li_2O$, the adjustment of the mobility becomes easier and, as the total alkali concentration lowers, weather fastness is also improved. When the glass composition according to the invention is used, a lens having a sufficient angular aperture can be obtained. Thus, as the mobility of alkali ions can be adjusted in the invention, even when the ion exchange temperature is increased to lower the viscosity of the glass composition, the mobility of alkali ions can be restrained. As a result, high quality graded index lenses having low residual stress and high reproducibility can be obtained. The distortion of lenses can also be inhibited.

According to the glass composition in the invention, lenses small in chromatic aberration can be obtained, since the amount of $TiO_2$ is corrected. When the lenses manufactured in the invention are assembled in array, a graded index lens array having good performance can be obtained, so that an optical product and an optical instrument having a high quality can be obtained.

DESCRIPTION OF REFERENCE NUMERALS

1: Graded index lens
2: Glass rod
3: Ion exchange tank
4: Molten salt
6: Refractive index distribution curve
10: Lens array
11: Lens element
12: FRP substrate
13: Black resin

DETAILED DESCRIPTION OF THE INVENTION

The mother glass composition for graded index lenses in the invention comprises the following glass components in mol %:

$40 \leq SiO_2 \leq 65$,
$1 \leq TiO_2 \leq 10$,
$0 \leq MgO \leq 22$,
$2 \leq Li_2O \leq 18$,
$2 \leq Na_2O \leq 20$,
$6 \leq Li_2O+Na_2O \leq 38$, and any two or more of CaO, SrO and BaO are from 0.1 to 15 mol %.

In the mother glass composition according to the invention, the reasons for specifying the range of each component are as follows.

($SiO_2$)

$SiO_2$ is a main component for forming the network structure of glass.

When the concentration of $SiO_2$ in the glass composition is less than 40 mol %, the concentrations of other chemical components must be relatively increased for exhibiting the characteristics of the lens, by which the glass becomes liable to be devitrified. While when the concentration of $SiO_2$ is less than 40 mol %, the chemical durability conspicuously lowers.

On the other hand, when the concentration of $SiO_2$ exceeds 65 mol %, the concentrations of alkali components for forming refractive index distribution, refractive index-increasing components and physical properties-adjusting components are restricted. Therefore, it becomes extremely difficult to obtain a practicable glass composition to impart refractive index distribution.

Accordingly, the concentration of $SiO_2$ is from 40 to 65 mol %.

($TiO_2$)

$TiO_2$ is a component to increase the refractive index of a mother glass composition and it is an essential component of a mother glass composition. By increasing the refractive index of a mother glass composition, the central refractive index of a graded index lens can be heightened. As a result, the central refractive index of the lens rises after ion exchange processing, so that the angular aperture θ can be widened. Further, by increasing $TiO_2$, the refractive index distribution gets nearer to ideal state of distribution and the resolution is bettered. When the concentration of $TiO_2$ was made 10 mol %, the reduction of resolution was not observed. On the other hand, when the amount of $TiO_2$ is made less than 1 mol %, the resolution apparently lowers, so that this is not practicable as a lens.

On the other hand, when the concentration of $TiO_2$ exceeds 10 mol %, conspicuous coloring is observed. Therefore, this is not practicable as the mother glass composition for lenses, since chromatic aberration becomes great with the coloring as the cause.

For obtaining a lens having small chromatic aberration and high resolution, the concentration of $TiO_2$ is from 1 to 10 mol %, and more preferably from 2 to 8 mol %.

(MgO)

MgO is a component to decrease the melting temperature of a mother glass composition and to increase the refractive index difference between the central part and the peripheral part of a lens (Δn) after ion exchange. MgO is conventionally an essential component in a lead-free lens, but the present inventors have found that sufficient performances can be obtained as a lens even when MgO is replaced with other alkaline earth.

When the concentration of MgO exceeds 22 mol %, the mother glass composition is liable to be devitrified. Further, the addition of MgO in concentration exceeding 22 mol % results in the remarkable reduction of the addition amounts of other components, so that it is difficult to obtain practicable glass.

When the concentration of MgO is less than 2 mol %, it is necessary to increase the contents of other alkaline earth to thereby obtain sufficient refractive index difference or the effect of decreasing ion mobility. Considering the preferred concentrations of CaO, SrO and BaO, the content of MgO is preferably 2 mol % or more.

Therefore, the concentration of MgO is preferably from 0 to 22 mol %, more preferably from 2 to 22 mol %, and still more preferably from 2 to 16 mol %.

($Li_2O$)

$Li_2O$ is one of the most important components in ion exchange processing applicable to the mother glass composition in the invention.

When the concentration of $Li_2O$ in a glass composition is less than 2 mol %, the difference in the concentration distributions given by ion exchange to form refractive index distribution cannot be made great. As a result, the glass composition cannot give functions as a lens.

On the other hand, when the concentration of $Li_2O$ exceeds 18 mol %, the devitrification of the glass is liable to occur, so that the mother glass of a lens is formed with difficulty. In addition, the weather fastness is deteriorated.

Accordingly, the concentration of $Li_2O$ is from 2 to 18 mol %, preferably from 2 to 12 mol %, more preferably 2 or more and less than 12 mol %, still more preferably from 5 to 12 mol %, and most preferably 5 or more and less than 12 mol %.

($Na_2O$)

$Na_2O$ has the effect of assisting ion exchange of Li for ions of ion exchange species (the ions contained in a molten salt) to be exchanged for Li, by a so-called mixed alkali effect, to thereby maintain ion mobility properly. By maintaining ion mobility properly, an ion exchange speed can be preferably adjusted, and it becomes possible to adjust optical characteristics.

When the concentration of $Na_2O$ in a glass composition is less than 2 mol %, the glass hardens at the time of glass formation to make the formation difficult. In addition, the melting point of the mother glass extremely rises and the manufacture of the mother glass of a lens becomes difficult. Further, an effect of appropriately maintaining the mobility of ions cannot be sufficiently obtained.

On the other hand, when the concentration of $Na_2O$ exceeds 20 mol %, the chemical durability of the mother glass lowers, thus is impracticable.

Accordingly, the concentration of $Na_2O$ is preferably from 2 to 20 mol %, more preferably from 2 to 15 mol %, and still more preferably from 5 to 15 mol %.

($Li_2O+Na_2O$)

In the mother glass composition in the invention, the range of the total content of $Li_2O+Na_2O$ is made as $6 \leq Li_2O+Na_2O \leq 38$ (mol %). In this range of $Li_2O+Na_2O$, good resolution can be obtained. Preferably the range is $6 \leq Li_2O+Na_2O \leq 32$ (mol %), more preferably $6 \leq Li_2O+Na_2O \leq 27$ (mol %), and still more preferably $10 \leq Li_2O+Na_2O < 27$ (mol %).

($Li_2O/Na_2O$)

The ratio of $Li_2O$ to $Na_2O$ is preferably $0.7 \leq Li_2O/Na_2O \leq 2$ (in molar ratio).

For example, when high resolution is required as a lens, it is preferred to select the range of $0.7 \leq Li_2O/Na_2O \leq 1.5$. When their ratio is in this range, the best resolution can be obtained.

Further, when a great angular aperture θ is required as a lens, it is preferred to select the range of $1.0 \leq Li_2O/Na_2O \leq 2.0$. When their ratio is in this range, the maximum angular aperture θ can be ensured.

(CaO, SrO, BaO)

CaO, SrO and BaO are extremely important components as the components to lessen the alkali ion mobility of a mother glass composition.

When the concentrations of any two or more of CaO, SrO and BaO are less than 0.1 mol %, the concentration of one alkaline earth oxide becomes great, which results in the reduction of entropy, and crystals originating in that alkaline earth oxide of high concentration are liable to occur and susceptible to devitrification.

On the other hand, any two or more of CaO, SrO and BaO exceed 15 mol %, crystals originating in the alkaline earths of high concentration are liable to occur and susceptible to devitrification, so that the glass composition is not suitable for lenses.

Accordingly, the concentrations of any two or more of CaO, SrO and BaO are from 0.1 to 15 mol %, and preferably from 2 to 12 mol %.

It is possible to make ion exchange speed small with BaO alone, but the effect of restraining the crystallization at the time of glass formation can be obtained by the addition of SrO. That is, by substituting a part of Ba with Sr, the formation of crystals containing, e.g., Ba—Ti—O, is restrained, so that the crystallization (devitrification) at the time of glass formation can be prevented.

BaO, SrO and CaO have, in this order, a high effect to lower alkali ion mobility. Accordingly, it is preferred that the concentrations of SrO and BaO are from 0.1 to 15 mol % and the concentration of CaO is from 0 to 15 mol %, more preferably the concentrations of SrO and BaO are from 2 to 12 mol % and the concentration of CaO is from 0 to 15 mol %.

CaO+SrO+BaO is from 2 to 25 mol %, and particularly preferably from 4 to 20 mol %.

MgO+CaO+SrO+BaO is from 5 to 47 mol %, and particularly preferably from 5 to 36 mol %.

An appropriate value of alkali ion exchange speed varies depending upon the diameter of a lens. In the case of a big lens, time is taken until the finish of ion exchange even if ion exchange speed is fast and sufficient time for structural relaxation can be taken, so that a lens having satisfactory performance can be obtained. Accordingly, the concentration of alkaline earths can be adjusted by using CaO and MgO in place of BaO in view of the equilibrium with the production costs.

Any two or more of CaO/(CaO+SrO+BaO), SrO/(CaO+SrO+BaO) and BaO/(CaO+SrO+BaO) are preferably 0.1 or more, and more preferably 0.2 or more. When these are less than 0.1 mol %, the concentration of one alkaline earth oxide of CaO, SrO and BaO becomes great, which results in the reduction of entropy, and crystals originating in that alkaline earth oxide of high concentration are liable to occur and susceptible to devitrification, so that this is not suited as the glass for lenses.

The glass composition in the invention may further contain the following components.

($B_2O_3$)

$B_2O_3$ is a component for forming a network structure of glass. $B_2O_3$ also has an effect of delaying ion exchange speed, although a little.

$B_2O_3$ is a component capable of accelerating vitrification to adjust the viscosity of glass with hardly changing the resolution and angular aperture θ of the lens to be obtained. By the way, there is a case where the ratios among essential components are objective values but the amount of a part of the components becomes too much as the composition relatively and, for example, devitrification is caused. In such a case, it is preferred to use $B_2O_3$ for the purpose of suppressing the concentration of the component that becomes relatively too much without changing the ratio among the essential components.

The amount of $B_2O_3$ that can be added without changing the resolution and angular aperture θ of the lens to be obtained is 20 mol % or less. Accordingly, the concentration of $B_2O_3$ is from 0 to 20 mol %, preferably from 0 to 10 mol %, and more preferably from 1 to 10 mol %.

$SiO_2+TiO_2+B_2O_3+Al_2O_3$ is from 41 to 70 mol %, and preferably from 50 to 70 mol %. $Al_2O_3$ can be added in concentration of from 0 to 10 mol %.

($ZnO$, $Y_2O_3$, $ZrO_2$, $Nb_2O_5$, $In_2O_3$, $La_2O_3$, $Ta_2O_5$)

With a view to adjusting a refractive index and improving weather fastness, the above components can be added in the following proportion. The total amount of the above components is preferably from 0 to 15 mol %, more preferably from 0.2 to 10 mol %.

The concentration of ZnO is preferably from 0 to 10 mol %, more preferably from 0 to 8 mol %.

The concentration of $Y_2O_3$ is preferably from 0 to 5 mol %.

The concentration of $ZrO_2$ is preferably from 0 to 2 mol %, more preferably from 0.2 to 2 mol %.

($K_2O$, $Cs_2O$)

$K_2O$ and $Cs_2O$ are components capable of lessening the mobility of alkali ions by a mixed alkali effect similarly to Mg, Ca, Sr and Ba. The concentration of $K_2O$ is preferably from 0 to 3 mol % and that of $Cs_2O$ is preferably from 0 to 3 mol %.

The graded index lens in the invention is a graded index lens the refractive index of which is formed by an ion exchange process, and the mother glass composition of the graded index lens comprises the glass composition according to the invention.

According to the use, it is preferred that the lens is provided with a means for exclusion of a noise light that is caused by the reflection of great incident light from an angular aperture at the side of the lens.

It is possible to exclude or reduce noise light by providing an absorption layer or a scattering layer at the side of the lens. Specifically, a method of providing a colored layer at the side of the lens to make the lens a core/clad structure, or a method of forming minute unevenness at the side of the lens are known. The noise light means so-called white noise.

The optical product in the invention may comprise the graded index lenses zero- to two-dimensionally arrayed so that optical axes are almost in parallel.

By arraying the graded index lenses in the invention, a broad range of erect real images (1:1) can be obtained with small diameter lenses.

The optical instrument in the invention is an instrument using these optical products.

The lens according to the invention is small in chromatic aberration depending upon the wavelength of the light source used, therefore, suitable for color scanner use.

To the glass composition in the invention can be added $Nb_2O_5$, $In_2O_3$, $La_2O_3$ and $Ta_2O_5$ respectively in concentration of from 0 to 5 mol %, and $GeO_2$ from 0 to 10 mol %. Further, as additives, $SnO_2$, $As_2O_3$ and $Sb_2O_3$ may be added respectively in an amount of from 0 to 1 mol %.

It is also possible to obtain the same effect as in the invention by the following compositions:

Composition 1:
A mother glass composition for graded index lenses, which comprises the following glass components in mol %:
  $40 \leq SiO_2 \leq 65$,
  $1 \leq TiO_2 \leq 10$,
  $0 \leq MgO < 2$,
  $2 \leq Li_2O \leq 18$,
  $2 \leq Na_2O \leq 20$,
  $6 \leq Li_2O+Na_2O \leq 38$, and any two or more of CaO, SrO and BaO are from 0.1 to 15 mol %.

Composition 2:
A mother glass composition for graded index lenses, which comprises the following glass components in mol %:
  $60 < SiO_2 \leq 65$,
  $1 \leq TiO_2 \leq 10$,
  $0 \leq MgO \leq 22$,
  $2 \leq Li_2O \leq 18$,
  $2 \leq Na_2O \leq 20$,
  $6 \leq Li_2O+Na_2O \leq 38$, and any two or more of CaO, SrO and BaO are from 0.1 to 15 mol %.

Composition 3:
A mother glass composition for graded index lenses, which comprises the following glass components in mol %:
  $40 \leq SiO_2 \leq 65$,
  $1 \leq TiO_2 \leq 2$,
  $0 \leq MgO \leq 22$,
  $2 \leq Li_2O \leq 18$,
  $2 \leq Na_2O \leq 20$,
  $6 \leq Li_2O+Na_2O \leq 38$, and any two or more of CaO, SrO and BaO are from 0.1 to 15 mol %.

Composition 4:
A mother glass composition for graded index lenses, which comprises the following glass components in mol %:
  $40 \leq SiO_2 \leq 65$,
  $1 \leq TiO_2 \leq 10$,
  $0 \leq MgO \leq 22$,
  $2 < Li_2O \leq 18$,
  $13 \leq Na_2O \leq 20$,
  $15 < Li_2O+Na_2O \leq 38$, and any two or more of CaO, SrO and BaO are from 0.1 to 15 mol %.

Composition 5:
The mother glass composition for graded index lenses as described in Composition 2 or 3, which comprises the following glass components in mol %:
  $0 \leq B_2O_3 \leq 20$,
  $2 \leq MgO \leq 22$,
  $0 \leq CaO \leq 15$,
  $0.1 \leq SrO \leq 15$,
  $0.1 \leq BaO \leq 15$, $2 \leq CaO+SrO+BaO \leq 25$,
$5 \leq MgO+CaO+SrO+BaO \leq 47$,
$2 \leq Li_2O \leq 12$,
$2 \leq Na_2O \leq 15$,
$6 \leq Li_2O+Na_2O \leq 27$,
$41 \leq SiO_2+TiO_2+B_2O_3+Al_2O_3 \leq 70$,
$0 \leq ZnO \leq 10$,
$0 \leq Y_2O_3 \leq 5$,
$0 \leq ZrO_2 \leq 2$, and
$0 \leq ZnO+Y_2O_3+ZrO_2+Nb_2O_5+In_2O_3+La_2O_3+Ta_2O_5 \leq 15$.

Composition 6:

The mother glass composition for graded index lenses as described in Composition 4, which comprises the following glass components in mol %:
$0 \leq B_2O_3 \leq 20$,
$2 \leq MgO \leq 22$,
$0 \leq CaO \leq 15$,
$0.1 \leq SrO \leq 15$,
$0.1 \leq BaO \leq 15$,
$2 \leq CaO+SrO+BaO \leq 25$,
$5 \leq MgO+CaO+SrO+BaO \leq 47$,
$2 \leq Li_2O \leq 12$,
$13 < Na_2O \leq 15$,
$15 < Li_2O+Na_2O \leq 27$,
$41 \leq SiO_2+TiO_2+B_2O_3+Al_2O_3 \leq 70$,
$0 \leq ZnO \leq 10$,
$0 \leq Y_2O_3 \leq 5$,
$0 \leq ZrO_2 \leq 2$, and
$0 \leq ZnO+Y_2O_3+ZrO_2+Nb_2O_5+In_2O_3+La_2O_3+Ta_2O_5 \leq 15$.

Composition 7:

The mother glass composition for graded index lenses as described in Composition 2 or 3, which comprises the following glass components in mol %:
$0 \leq B_2O_3 \leq 10$,
$2 \leq MgO \leq 16$,
$0 \leq CaO \leq 15$,
$2 \leq SrO \leq 12$,
$2 \leq BaO \leq 12$,
$4 \leq CaO+SrO+BaO \leq 20$,
$5 \leq MgO+CaO+SrO+BaO \leq 36$,
$5 \leq Li_2O \leq 12$,
$5 \leq Na_2O \leq 15$,
$10 \leq Li_2O+Na_2O \leq 27$,
$0 \leq K_2O \leq 3$,
$0 \leq Cs_2O \leq 3$,
$0.7 \leq Li_2O/Na_2O \leq 2$
$50 \leq SiO_2+TiO_2+B_2O_3+Al_2O_3 \leq 70$,
$0 \leq ZnO \leq 8$,
$0 \leq Y_2O_3 \leq 5$,
$0.2 \leq ZrO_2 \leq 2$, and
$0.2 \leq ZnO+Y_2O_3+ZrO_2+Nb_2O_5+In_2O_3+La_2O_3+Ta_2O_5 \leq 10$.

Composition 8:

The mother glass composition for graded index lenses as described in Composition 4, which comprises the following glass components in mol %:
$0 \leq B_2O_3 \leq 10$,
$2 \leq MgO \leq 16$,
$0 \leq CaO \leq 15$,
$2 \leq SrO \leq 12$,
$2 \leq BaO \leq 12$,
$4 \leq CaO+SrO+BaO \leq 20$,
$5 \leq MgO+CaO+SrO+BaO \leq 36$,
$5 \leq Li_2O \leq 12$,
$13 < Na_2O \leq 15$,
$18 < Li_2O+Na_2O \leq 27$,
$0 \leq K_2O \leq 3$,
$0 \leq Cs_2O \leq 3$,
$0.7 \leq Li_2O/Na_2O \leq 2$,
$50 \leq SiO_2+TiO_2+B_2O_3+Al_2O_3 \leq 70$,
$0 \leq ZnO \leq 8$,
$0 \leq Y_2O_3 \leq 5$,
$0.2 \leq ZrO_2 \leq 2$, and
$0.2 \leq ZnO+Y_2O_3+ZrO_2+Nb_2O_5+In_2O_3+La_2O_3+Ta_2O_5 \leq 10$.

Composition 9:

The mother glass composition for graded index lenses as described in Composition 2, which comprises the following glass components in mol %:
$2 \leq TiO_2 \leq 8$,
$0 \leq B_2O_3 \leq 10$,
$2 \leq MgO \leq 16$,
$0 \leq CaO \leq 15$,
$2 \leq SrO \leq 12$,
$2 \leq BaO \leq 12$,
$4 \leq CaO+SrO+BaO \leq 20$,
$5 \leq MgO+CaO+SrO+BaO \leq 36$,
$5 \leq Li_2O \leq 12$,
$5 \leq Na_2O \leq 15$,
$10 \leq Li_2O+Na_2O \leq 27$,
$0 \leq K_2O \leq 3$,
$0 \leq Cs_2O \leq 3$,
$0.7 \leq Li_2O/Na_2O \leq 2$,
$50 \leq SiO_2+TiO_2+B_2O_3+Al_2O_3 \leq 70$,
$0 \leq ZnO \leq 8$,
$0 \leq Y_2O_3 \leq 5$,
$0.2 \leq ZrO_2 \leq 2$, and
$0.2 \leq ZnO+Y_2O_3+ZrO_2+Nb_2O_5+In_2O_3+La_2O_3+Ta_2O_5 \leq 10$.

Composition 10:

The mother glass composition for graded index lenses as described in Composition 4, which comprises the following glass components in mol %:
$2 \leq TiO_2 \leq 8$,
$0 \leq B_2O_3 \leq 10$,
$2 \leq MgO \leq 16$,
$0 \leq CaO \leq 15$,
$2 \leq SrO \leq 12$,
$2 \leq BaO \leq 12$,
$4 \leq CaO+SrO+BaO \leq 20$,
$5 \leq MgO+CaO+SrO+BaO \leq 36$,
$5 \leq Li_2O \leq 12$,
$13 \leq Na_2O \leq 15$,
$18 < Li_2O+Na_2O \leq 27$,
$0 \leq K_2O \leq 3$,
$0 \leq Cs_2O \leq 3$,
$0.7 \leq Li_2O/Na_2O \leq 2$,
$50 \leq SiO_2+TiO_2+B_2O_3+Al_2O_3 \leq 70$,
$0 \leq ZnO \leq 8$,
$0 \leq Y_2O_3 \leq 5$,
$0.2 \leq ZrO_2 \leq 2$, and
$0.2 \leq ZnO+Y_2O_3+ZrO_2+Nb_2O_5+In_2O_3+La_2O_3+Ta_2O_5 \leq 10$.

Composition 11:

The mother glass composition for graded index lenses as described in Composition 9 or 10, wherein the content of $B_2O_3$ is from 1 to 10 mol %.

Composition 12:

The mother glass composition for graded index lenses as described in any of Compositions 1 to 11, wherein any two or more of CaO/(CaO+SrO+BaO), SrO/(CaO+SrO+BaO) and BaO/(CaO+SrO+BaO) are 0.1 or more.

Composition 13:

The mother glass composition for graded index lenses as described in any of Compositions 7 to 11, wherein any two or more of CaO/(CaO+SrO+BaO), SrO/(CaO+SrO+BaO) and BaO/(CaO+SrO+BaO) are 0.2 or more.

EXAMPLE

The present invention is described in further detail below with reference to examples and comparative examples.

A mother glass composition was prepared by the mixture and melt of the components shown in Table 1 or 2 below, and the composition was formed to fibrous glass rod (a diameter: 300 μm). Ion exchange process was performed by immersing the strand in a molten sodium nitrate salt heated at a glass transition temperature (the ion exchange temperature shown in Table 1 or 2) of each glass composition in every Example (or Comparative Example) (refer to FIG. 1) under the conditions shown in Tables 1 and 2. There is the optimal ion exchange time of every composition and a lens is not formed in either case where the ion exchange time is shorter or longer than the optimal time, so that ion exchange process was carried out at the optimal ion exchange time of every composition. Further, when the optimal ion exchange time is prolonged, the cost is increased, and when the time is shortened, the control of lens formation becomes difficult.

TABLE 1

| Ex. No. | \multicolumn{14}{c}{Condition Glass Component (mol %)} |
|---|---|

| Ex. No. | $Li_2O$ | $Na_2O$ | $K_2O$ | $Cs_2O$ | MgO | CaO | SrO | BaO | ZnO | PbO | $B_2O_3$ | $SiO_2$ | $TiO_2$ | $ZrO_2$ | $Sb_2O_3$ |
|---|---|---|---|---|---|---|---|---|---|---|---|---|---|---|---|
| 1 | 9.5 | 9.0 | — | — | 14.0 | — | 4.0 | 4.0 | — | — | — | 56.0 | 3.5 | — | — |
| 2 | 9.5 | 9.0 | — | — | 14.0 | — | 2.0 | 6.0 | — | — | 4.0 | 52.0 | 3.5 | 1.0 | 0.3 |
| 3 | 9.5 | 9.0 | — | — | 14.0 | — | 4.0 | 4.0 | — | — | 4.0 | 52.0 | 3.5 | 1.0 | 0.3 |
| 4 | 9.5 | 9.0 | — | — | 14.0 | — | 6.0 | 2.0 | — | — | 4.0 | 52.0 | 3.5 | 1.0 | 0.3 |
| 5 | 9.5 | 9.0 | — | — | 10.0 | — | 6.0 | 6.0 | — | — | — | 56.0 | 3.5 | 1.0 | 0.3 |
| 6 | 9.5 | 9.0 | — | — | 12.0 | — | 9.0 | 1.0 | — | — | 5.5 | 52.0 | 2.0 | 1.0 | 0.3 |
| 7 | 9.5 | 9.0 | — | — | 12.0 | — | 8.0 | 2.0 | — | — | 5.5 | 52.0 | 2.0 | 1.0 | 0.3 |
| 8 | 9.5 | 9.0 | — | — | 12.0 | — | 2.0 | 8.0 | — | — | 5.5 | 52.0 | 2.0 | 1.0 | 0.3 |
| 9 | 9.5 | 9.0 | — | — | 14.0 | — | 4.0 | 4.0 | — | — | 6.5 | 52.0 | 1.0 | 1.0 | 0.3 |
| 10 | 9.5 | 9.0 | — | — | 12.0 | — | 6.0 | 4.0 | — | — | 5.5 | 52.0 | 2.0 | 1.0 | 0.3 |
| 11 | 9.5 | 9.0 | — | — | 12.0 | — | 8.0 | 2.0 | — | — | 5.5 | 52.0 | 2.0 | 1.0 | 0.3 |
| 12 | 11.0 | 10.4 | — | — | 14.0 | — | 4.0 | 4.0 | — | — | — | 53.1 | 3.5 | — | — |
| 13 | 15.0 | 13.0 | — | — | 8.0 | — | 7.0 | 7.0 | — | — | 5.0 | 41.0 | 4.0 | 1.0 | 0.3 |
| 14 | 9.5 | 9.0 | — | — | 14.0 | — | 4.0 | 4.0 | — | — | 3.0 | 53.0 | 3.5 | 1.0 | 0.3 |
| 15 | 9.5 | 9.0 | — | — | 14.0 | — | 4.0 | 4.0 | — | — | 6.0 | 50.0 | 3.5 | 1.0 | 0.3 |
| 16 | 8.0 | 8.0 | 2.5 | — | 14.0 | — | 4.0 | 4.0 | — | — | — | 56.0 | 3.5 | — | — |
| 17 | 8.0 | 8.0 | 2.5 | — | 14.0 | — | 4.0 | 4.0 | — | — | 6.0 | 50.0 | 3.5 | — | — |
| 18 | 9.5 | 9.0 | 1.0 | — | 14.0 | — | 4.0 | 4.0 | — | — | — | 55.0 | 3.5 | — | — |
| 19 | 9.5 | 9.0 | 4.5 | — | 14.0 | — | 4.0 | 4.0 | — | — | — | 51.5 | 3.5 | — | — |
| 20 | 9.5 | 10.7 | — | 1.0 | 14.0 | — | 4.0 | 4.0 | — | — | 2.0 | 51.3 | 3.5 | — | — |
| 21 | 9.5 | 9.0 | — | 4.5 | 14.0 | — | 4.0 | 4.0 | — | — | 2.0 | 48.0 | 5.0 | — | — |
| 22 | 9.5 | 9.0 | — | — | 18.0 | — | 2.0 | 2.0 | — | — | 2.0 | 54.0 | 3.5 | 1.0 | 0.3 |
| 23 | 9.9 | 9.4 | — | — | — | 14.0 | 4.0 | 4.0 | — | — | 3.0 | 52.2 | 3.5 | 1.0 | 0.3 |
| 24 | 9.9 | 9.4 | — | — | 10.0 | 4.0 | 4.0 | 4.0 | — | — | 3.0 | 52.2 | 3.5 | 1.0 | 0.3 |
| 25 | 9.9 | 9.4 | — | — | 4.0 | 10.0 | 4.0 | 4.0 | — | — | 3.0 | 52.2 | 3.5 | 1.0 | 0.3 |
| 26 | 9.9 | 9.4 | — | — | — | 14.0 | 8.0 | — | — | — | 3.0 | 52.2 | 3.5 | 1.0 | 0.3 |
| 27 | 9.9 | 9.4 | — | — | — | 14.0 | — | 8.0 | — | — | 3.0 | 52.2 | 3.5 | 1.0 | 0.3 |
| 28 | 9.5 | 9.0 | — | — | 14.0 | 4.0 | — | 4.0 | — | — | 4.0 | 52.0 | 3.5 | 1.0 | 0.3 |
| 29 | 9.5 | 9.0 | — | — | 14.0 | 4.0 | 4.0 | — | — | — | 4.0 | 52.0 | 3.5 | 1.0 | 0.3 |

| Ex. No. | Condition Ion Exchange Temp. (°C.) | Ion Exchange Time (hr) | Devitrification | Image | Evaluation Angular Aperture θ (deg.) | Use Efficiency of Li [Li]p/[Li]i (%) |
|---|---|---|---|---|---|---|
| 1 | 488.9 | 7.3 | B | ◎ | 11.9 | 65.9 |
| 2 | 483.0 | 10.0 | A | ◎ | 12.3 | 70.9 |
| 3 | 478.0 | 12.2 | A | ◎ | 12.4 | 71.1 |
| 4 | 479.0 | 10.2 | A | ◎ | 12.1 | 68.2 |
| 5 | 494.0 | 7.6 | B | ◎ | 11.5 | 62.0 |
| 6 | 488.5 | 7.9 | C | ◎ | 12.1 | 68.5 |
| 7 | 488.5 | 7.9 | A | ◎ | 12.1 | 68.5 |
| 8 | 479.5 | 7.9 | A | ◎ | 12.1 | 68.5 |
| 9 | 487.3 | 7.8 | A | Δ | 11.5 | 61.9 |
| 10 | 484.2 | 12.7 | A | ○ | 11.7 | 63.7 |
| 11 | 485.7 | 9.1 | A | ◎ | 11.7 | 63.9 |
| 12 | 457.8 | 6.0 | B | ◎ | 11.9 | 56.8 |
| 13 | 383.0 | 3.0 | C | Δ | 12.9 | 49.3 |
| 14 | 484.9 | 9.5 | A | ◎ | 11.7 | 63.7 |
| 15 | 484.0 | 10.0 | A | ◎ | 12.3 | 70.2 |
| 16 | 486.0 | 15.7 | B | ◎ | 11.0 | 66.9 |
| 17 | 482.4 | 17.6 | B | ◎ | 11.3 | 70.9 |
| 18 | 477.1 | 8.7 | B | ◎ | 11.9 | 65.7 |

TABLE 1-continued

| | | | | | | |
|---|---|---|---|---|---|---|
| 19 | 448.7 | 37.5 | B | ▲ | 8.8 | 36.2 |
| 20 | 462.4 | 12.3 | B | ◉ | 12.2 | 69.5 |
| 21 | 462.4 | 45.0 | B | ▲ | 12.2 | 69.5 |
| 22 | 502.4 | 3.5 | A | ◉ | 12.4 | 71.1 |
| 23 | 489.1 | 9.9 | B | ◉ | 10.1 | 46.0 |
| 24 | 473.0 | 10.6 | B | ◉ | 11.5 | 58.9 |
| 25 | 479.4 | 11.9 | B | ◉ | 10.2 | 46.7 |
| 26 | 495.6 | 9.4 | B | ◉ | 10.1 | 46.0 |
| 27 | 482.6 | 10.4 | B | ◉ | 10.1 | 46.0 |
| 28 | 493.3 | 10.0 | B | ◉ | 11.6 | 62.3 |
| 29 | 498.2 | 9.6 | B | ◉ | 11.4 | 60.4 |

TABLE 2

| Comp. Ex. No. | Condition Glass Component (mol %) | | | | | | | | | | | | | | |
|---|---|---|---|---|---|---|---|---|---|---|---|---|---|---|---|
| | $Li_2O$ | $Na_2O$ | $K_2O$ | $Cs_2O$ | MgO | CaO | SrO | BaO | ZnO | PbO | $B_2O_3$ | $SiO_2$ | $TiO_2$ | $ZrO_2$ | $Sb_2O_3$ |
| 1 | 9.5 | 9.0 | — | — | 14.0 | — | — | 2.0 | — | 6.0 | — | 56.0 | 3.5 | 1.0 | 0.3 |
| 2 | 12.3 | 11.7 | — | — | 14.0 | — | — | 2.0 | — | — | 2.5 | 52.0 | 5.5 | — | — |
| 3 | 9.5 | 9.0 | — | — | 14.0 | — | — | 8.0 | — | — | — | 56.0 | 3.5 | — | — |
| 4 | 9.5 | 9.0 | — | — | 12.0 | — | — | 10.0 | — | — | — | 56.0 | 3.5 | 1.0 | 0.3 |
| 5 | 9.5 | 9.0 | — | — | 10.0 | — | — | 12.0 | — | — | — | 56.0 | 3.5 | 1.0 | 0.3 |
| 6 | 11.0 | 10.4 | — | — | 14.0 | — | — | 8.0 | — | — | — | 53.1 | 3.5 | — | — |
| 7 | 9.5 | 9.0 | — | — | 14.0 | — | 8.0 | — | — | — | 4.0 | 52.0 | 3.5 | 1.0 | 0.3 |
| 8 | 9.5 | 9.0 | — | — | 12.0 | — | 10.0 | — | — | — | 5.5 | 52.0 | 2.0 | 1.0 | 0.3 |
| 9 | 9.5 | 9.0 | — | — | 14.0 | — | — | 11.5 | — | — | — | 56.0 | — | 1.0 | 0.3 |
| 10 | 9.5 | 9.0 | — | — | 14.0 | — | 6.0 | 6.0 | — | — | 3.5 | 52.0 | — | 1.0 | 0.3 |
| 11 | 9.5 | 9.0 | — | — | 22.0 | — | — | — | — | — | — | 56.0 | 3.5 | — | — |
| 12 | 9.5 | 9.0 | — | — | 14.0 | 8.0 | — | — | — | — | 4.0 | 52.0 | 3.5 | 1.0 | 0.3 |
| 13 | 19.0 | 15.0 | — | — | 8.0 | — | 6.0 | 6.0 | — | — | 3.0 | 44.0 | 4.0 | 1.0 | 0.3 |
| 14 | 9.5 | 9.0 | — | — | 14.0 | — | — | — | 8.0 | — | — | 56.0 | 3.5 | — | — |

| Comp. Ex. No. | Condition Ion Exchange | | Evaluation | | | Use Efficiency of Li |
|---|---|---|---|---|---|---|
| | Temp. (° C.) | Time (hr) | Devitrification | Image | Angular Aperture θ (deg.) | [Li]p/[Li]i (%) |
| 1 | 445.0 | 11.5 | B | ◉ | 11.9 | 65.6 |
| 2 | 487.2 | 1.5 | C | ◉ | 12.5 | 55.8 |
| 3 | 481.3 | 7.8 | D | ◉ | 11.8 | 64.5 |
| 4 | 482.8 | 8.0 | E | ◉ | 11.8 | 64.9 |
| 5 | 482.1 | 8.2 | E | ◉ | 11.5 | 62.0 |
| 6 | 457.8 | 6.0 | D | ◉ | 11.9 | 56.8 |
| 7 | 481.0 | 11.4 | D | ◉ | 12.4 | 71.7 |
| 8 | 488.5 | 7.9 | D | ◉ | 12.1 | 68.5 |
| 9 | 452.0 | 11.4 | D | X | 11.3 | 60.0 |
| 10 | 469.0 | 7.6 | B | X | 11.7 | 63.6 |
| 11 | 525.0 | 3.4 | C | ◉ | 8.8 | 36.5 |
| 12 | 502.3 | 9.0 | E | ◉ | 11.2 | 58.8 |
| 13 | 350.0 | 1.8 | E | X | 12.3 | 37.2 |
| 14 | 492.6 | 3.4 | C | ◉ | 11.8 | 64.8 |

As a result, Li ions in the glass rod are exchanged for Na ions in the mixed molten salt, and refractive index distribution based on the distribution of the concentration is formed. Each graded index lens was manufactured in this manner (refer to FIG. 2).

With the mother glass compositions and the graded index lenses manufactured, the following evaluations were carried out.

(1) Evaluation of Devitrification

Each mother glass composition was pulverized to particles having a diameter of about 1 mm and thoroughly washed with methanol, the particles were evenly put in a platinum boat of 200 mm in length, 12 mm in breadth and 8 mm in depth, once melted at 1,300° C. for 1 hour, and then the boat was held in a gradient furnace at 600 to 1,025° C. for 12, 18, 24, 48 and 100 hours.

Thereafter, the glass was observed with a microscope for the occurrence of devitrification, and evaluated according to the following criteria.

A: Not devitrified in 100 hours.
B: Devitrified in 48 hours.
C: Devitrified in 24 hours.
D: Devitrified in 18 hours.
E: Devitrified in 12 hours.

In industrially manufacturing glass, evaluation of grade C or higher is preferred.

(2) Evaluation of Image

Figure 5:
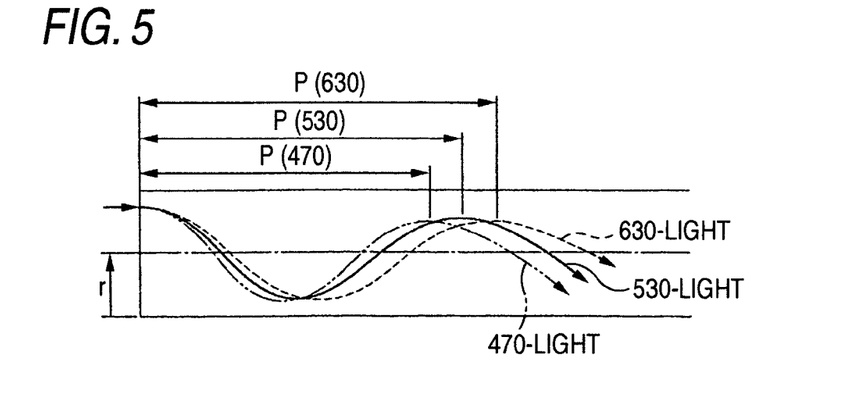
FIG. 5 is a drawing explaining pitch P.

Lens performance was evaluated as follows. A graded index lens was cut in an appropriate length (pitch P), and both sides of the lens were mirror-polished in parallel. Pitch P is P in FIG. 5. In FIG. 5, P (630) is a pitch at wavelength of 630 nm, P (530) is a pitch at wavelength of 530 nm, P (470) is a pitch at wavelength of 470 nm, and r is the radius of the lens. A checkered pattern was brought into contact with one side of the lens, and the lens performance was evaluated from the shape of the image as follows.

◎: The pattern was clearly imaged all through the side with no distortion.

○: The image of pattern at the central part of the side was clear but slightly distorted at the peripheral part.

Δ: The image of pattern at the central part of the side was clear but extremely distorted at the peripheral part.

X: The image was greatly distorted both at the central part and the peripheral part, and did not function as lens at all.

(3) Evaluation of Angular Aperture

Figure 4:
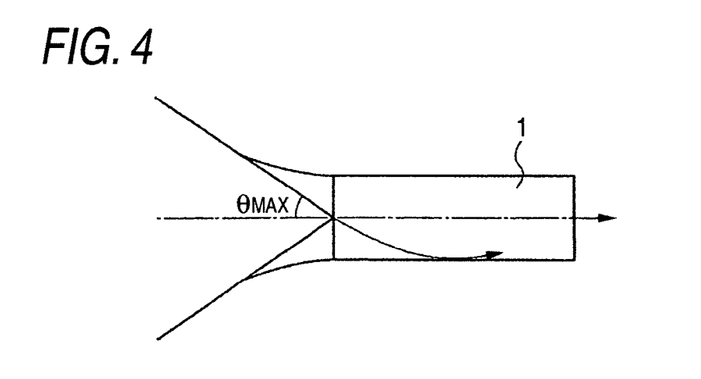
FIG. 4 is a drawing explaining angular aperture θ.

An angular aperture is the maximum incident angle capable of changing the direction of beam by lens (FIG. 4). The angular aperture was evaluated as follows.

In the first place, the above manufactured graded index lens was cut in an appropriate length and both sides of the lens were mirror-polished in parallel. A checkered pattern was brought into contact with one side of the lens, and pitch P was found by observing the erect image of the checkered pattern from the opposite side. A refractive index distribution coefficient $\sqrt{A}$ was computed by using the relationship of $\sqrt{A}=2\pi/P$. Angular aperture $\theta$ was found with $\sqrt{A}$, radius r0 of the lens, and the refractive index of the glass rod before ion exchange Nc measured by a total reflection critical method with a Pulfrich refractometer according to the following equation:

$$\sin\theta = \sqrt{A} \cdot Nc \cdot r0$$

From the fact that the refractive indexes of the glass rods before ion exchange in Examples and Comparative Examples were about 1.59 from the above relationship between $\theta$ and Nc, and that the differences in angular aperture $\theta$ obtained were sufficiently small even when the central refractive indexes were approximated, the refractive index at the central part of the graded index lens after ion exchange Nc was taken as 1.59 in computation.

In Examples, each composition was determined so that the angular aperture became about 10.1 to 12.9°, but it is also possible to use other angles by arbitrarily changing the compositions.

(4) Evaluation of the use efficiency of Li

In an ion exchange process, ion exchange starts from the peripheral side of glass rod in contact with a molten salt, and ion exchange gradually progresses toward the central part of the glass rod. Ideally, it is preferred that all Li at the peripheral part are ion exchanged, the amount of ion exchange gradually lessens toward the central part, and Li is not ion exchanged at all at the central part of the glass rod to thereby finish ion exchange process. In this case, the difference in Li concentration between the peripheral part and the central part of the graded index lens manufactured becomes largest, and the difference in the refractive index between the peripheral part and the central part of the lens is also largest. However, when ion exchange process is continued until the time when refractive index distribution satisfying the performance as lens is obtained, even a part of Li at the central part of the glass rod is ion exchanged actually. As a result, the concentration of Li at the central part of the glass rod lowers and the difference in refractive index between the peripheral part and the central part becomes small. Accordingly, for obtaining desired refractive index difference, considering the ion exchange at the central part of glass rod, it is necessary to make the Li concentration in the mother glass composition high, which results in the high cost of material. In addition, if it is necessary to make Li concentration high, devitrification is liable to occur in forming mother glass, thus accompanied by the drawback of the reduction of degree of freedom in manufacturing conditions.

The ratio of Li content at the central part of glass rod before ion exchange [Li]i and Li content at the central part of graded index lens after ion exchange [Li]p, [Li]p/[Li]i, is defined as the use efficiency of Li. The use efficiency of Li is computed as follows.

In the case where ideal ion exchange is performed and a graded index lens is manufactured such that all of Li at the peripheral part of the glass rod are ion exchanged, and Li is not ion exchanged at all at the central part of the glass rod, taking the refractive index at the central part of lens as Nc (ideal), the refractive index at the peripheral part of lens as Ne (ideal), and the difference in these refractive indexes as ΔN (ideal), the following relationship is formed:

$$\Delta N \text{ (ideal)} = Nc \text{ (ideal)} - Ne \text{ (ideal)}$$

On the other hand, in the case where ion exchange is performed actually, taking the refractive index at the central part of the lens as Nc (lens), the refractive index at the peripheral part of the lens as Ne (lens), and the difference in these refractive indexes as ΔN (lens), the following relationship is formed:

$$\Delta N \text{ (lens)} = Nc \text{ (lens)} - Ne \text{ (lens)}$$

Here, ΔN (lens) is obtained by the observation of lens pitch P and from the following equation:

$$\sin\theta = 2\pi \cdot r0 \cdot Nc/P = \sqrt{(2 \cdot Nc \cdot \Delta N(\text{lens}))}$$

wherein $\theta$ is angular aperture, r0 is the radius of lens, Nc is the refractive index of glass rod before ion exchange process, and P is pitch. The refractive index of glass rods in Examples and Comparative Examples before ion exchange process is 1.59, and the attribution of the change in the refractive index at the central part of lens to angular aperture $\theta$ is little, so that Nc is taken as 1.59 by approximation.

Here, since the peripheral part of lens is thought to be sufficiently ion exchanged, Ne (lens) can be approximated to Ne (ideal). Thus, the following relationship is formed:

$$\Delta N(\text{lens}) = Nc(\text{lens}) - Ne(\text{lens})$$
$$= Nc(\text{lens}) - Ne(\text{ideal})$$

Since the refractive index difference of the lens in the invention before and after ion exchange is in proportion to Li content, the following relationship is formed between the Li content at the central part of the lens [Li]i and Li content at the central part of the lens after ion exchange [Li]p:

$$[Li]p/[Li]i = \Delta N \text{ (lens)}/\Delta N \text{ (ideal)}$$

The use efficiency of Li was computed from the above equation. The use efficiency of Li is preferably the higher, and the use efficiency of Li in industrial manufacture is preferably 40% or more.

Examples 1 to 8

As shown in Table 1, of CaO, SrO and BaO, the compositions in Examples 1 to 8 contain SrO and BaO.

In Examples 1 to 8, ion exchange time is from 7.3 to 12.2 hours, which is industrially suitable.

The result of evaluation of image is ⊚, and the pattern is clearly imaged all through the side with no distortion.

The use efficiency of Li is from 62.0 to 71.1%, which shows a good result.

Examples 9 to 11

In Examples 9 to 11, the concentration of $TiO_2$ is 1.0 mol % or 2.0 mol %, this is a low value almost equal to the lowest value of 1 mol % of $TiO_2$ in the invention.

In Examples 9 to 11, the evaluation results of image are respectively Δ, ○ and ⊚, ion exchange time is from 7.8 to 12.7 hours, and the use efficiency of Li is 61.9% or more, and the results are good.

Examples 12 and 13

In Example 12, the concentration of $TiO_2$ is 11 mol %, which is a little high, but ion exchange time is 6.0 hours, and the use efficiency of Li is 56.8%, which is good results.

From Examples 12 and 13, it can be seen that high Li concentration results in short ion exchange time.

Examples 14 and 15

In Examples 14 and 15, the compositions respectively contain $B_2O_3$ in concentration of 3 mol % and 6 mol %. In both Examples, devitrification did not occur and good lenses were obtained.

Examples 16 to 20

The compositions in Examples 16 and 17 contains 2.5 mol % of $K_2O$, the composition in Example 18 contains 1.0 mol % of $K_2O$ and that in Example 19 is 4.5 mol %.

In Examples 16 to 18, ion exchange time is from 8.7 to 17.6 hours, which is a preferred value in industrial manufacture.

The composition in Example 19 contains $K_2O$ as high as 4.5 mol %. Accordingly the result of image evaluation is inferior to those in Examples 16 to 18. When a great amount of $K_2O$ is contained, the effective area of the lens becomes small.

Examples 20 and 21

The composition in Example 20 contains 1.0 mol % of $Cs_2O$. The ion exchange time in Example 20 is 12.30 hours, which is suitable for industrial manufacture.

The composition in Example 21 contains $Cs_2O$ in such a high amount as 4.5 mol %. Therefore, the result of image evaluation is inferior to that in Example 20. When a great amount of $Cs_2O$ is contained, the effective area of the lens becomes small.

Example 22

In Example 22, the concentrations of CaO, SrO and BaO are respectively 0 mol %, 2 mol % and 2 mol %, and the total amount of them is 4.0 mol %, which is a little small amount, but all of devitrification, image evaluation and the use efficiency of Li show good results.

Examples 23 to 25

The compositions in Examples 23 to 25 contain CaO in addition to SrO and BaO, but ion exchange time is from 9.9 to 11.9 hours, which is suitable for industrial manufacture, and image evaluation also shows good results.

Examples 26 and 29

Examples 26 and 29 do not contain BaO and contain CaO and SrO.

In Examples 26 and 29, ion exchange time is 9.4 hours and 9.6 hours respectively, which are good values. Devitrification is grade B and good.

Examples 27 and 28

The compositions in Examples 27 and 28 do not contain SrO and contain CaO and BaO.

In Examples 27 and 28, ion exchange time is 10.4 hours or 10.0 hours, which is good, and devitrification shows an excellent result.

Comparative Example 1

The composition in Comparative Example 1 contains toxic PbO in 6.0 mol %.

When Comparative Example 1 is compared with Examples 1 to 29, it is seen that Examples 1 to 29 are almost equal to Comparative Example 1 in devitrification, image evaluation and the use efficiency of Li.

Comparative Examples 2 to 8

The compositions in Comparative Examples 2 to 6 contain only BaO of CaO, SrO and BaO, and Comparative Examples 7 and 8 contain only SrO of CaO, SrO and BaO.

In Comparative Example 2, ion exchange time is as short as 1.50 hours, which value is not suitable for industrial manufacture.

Comparative Examples 3 to 8 are evaluated grade D or E for devitrification, so that inferior in devitrification.

Comparative Examples 9 and 10

Comparative Examples 9 and 10 do not contain $TiO_2$.

In the evaluations in Comparative Examples 9 and 10, the result of evaluation of image is graded ×, so that image evaluation is bad. In Comparative Example 9, devitrification is graded D, thus inferior in devitrification.

Comparative Examples 11 and 14

Comparative Examples 11 and 14 contain none of CaO, SrO and BaO. In Comparative Examples 11 and 14, ion exchange time is 3.40 hours, which value is not suitable for industrial manufacture.

Comparative Example 12

The composition in Comparative Example 12 contains 8.0 mol % of CaO and does not contain SrO and BaO.

Devitrification in Comparative Example 12 is grade E, so that inferior in devitrification.

Comparative Example 13

The composition in Comparative Example 13 contains 19.0 mol % of $Li_2O$, which is an excess amount.

Devitrification in Comparative Example 13 is grade E, so that inferior in devitrification. Further, the use efficiency of Li is 37.2%, which is extremely low.

Example 30

A cylindrical lens having a diameter of 570 μm was prepared with the same glass composition and the same manner as in Example 3, and unevenness was formed on the side of the lens. The obtained lens elements were two-dimensionally arrayed, and the schematic view of the lens array is shown in FIG. 3.

Figure 3:
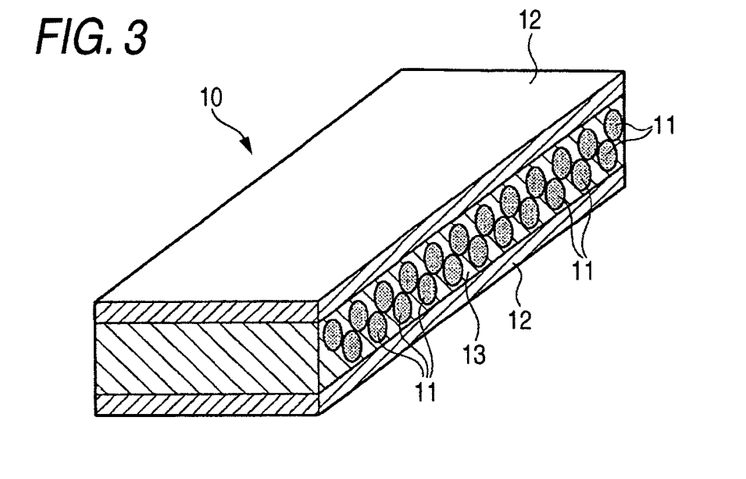
FIG. 3 is a schematic drawing of a lens array of two dimensionally arraying lens elements.

As shown in FIG. 3, a plurality of lens elements 11 are two-dimensionally arrayed, and the plurality of lens elements 11 are sandwiched by a pair of glass fiber reinforced resin (FRP) substrate 12. Black resin 13 is filled in the space between the pair of FRP substrate 12 and the plurality of lens elements 11.

As the chemical characteristic of the thus-constituted lens array, the reproducibility of image is evaluated. This evaluation is performed by the measurement of the rate of image reproducibility according to MTF (Modulation Transfer Function) method. That is, a prescribed line chart is placed on the incident side of the lens array, the line chart is irradiated with halogen light through a color filter and a light diffusing plate, and the thus obtained image is formed on the output plate through the lens array as an erect image of 1/1. At this time, the rate of reproducibility of the erect image to the incident image is measured.

In the invention, with a line pair of rectangular wave shown by on/off as one set, a line pattern having 8 sets of the line pairs in the distance of 1 mm (8 lpm) is used.

In the lens array in Example 30, the image reproduction rate is 68%, showing good value of 60% or higher.

By using the thus-formed lens array, optical instruments excellent in chemical characteristics can be constituted. For example, when lens array like the lens array in Example 30 is built in scanners or copiers as the image read-out unit, a high resolution and sharp image can be reproduced.

Further, printers composed of an image-writing unit built with such a lens array and a luminescence element can reproduce a high resolution and sharp image.

In FIG. 3, a lens array comprising two-dimensionally arrayed plurality of lens elements is used as the optical element, but the invention is not limited thereto. That is, an optical element comprising zero-dimensionally arrayed lens element can be used as an optical element. That is, one lens can be used as an optical element. A lens array comprising optical elements one-dimensionally arrayed can also be used. Further, with respect to two-dimensional lens arrays, optical elements can be made of not only two in row but a plurality of rows can be arrayed applicable to a great area.

Example 31

The results of the measurement of one pitch of every light source wavelength of the lens used in Example 30 are as follows.

TABLE 3

| Wavelength of Light Source (nm) | One Pitch (mm) |
|---|---|
| 470 | 14.335 |
| 630 | 14.355 |

The difference in a pitch of light source wavelengths of 630 nm and 470 nm is 0.02 mm, and the average rate of change (the value obtained by dividing 0.02 mm by the average value at the wavelengths of 470 nm and 630 nm) is 0.1383%, which shows that the lens is small in chromatic aberration depending upon the light source used. MTF is also the same good value as in Example 28. The lenses according to the invention can be preferably used, for example, for color scanners.

This application is based on Japanese patent application JP 2004-110769, filed on Apr. 5, 2004, the entire content of which is hereby incorporated by reference, the same as if set forth at length.

What is claimed is:

1. A mother glass composition for graded index lenses, which comprises the following glass components in mol %:
$40 \leq SiO_2 \leq 65$,
$1 \leq TiO_2 \leq 10$,
$0 \leq MgO \leq 22$,
$2 \leq Li_2O \leq 18$,
$2 \leq Na_2O \leq 20$,
$6 \leq Li_2O+Na_2O \leq 38$,
$0 \leq CaO \leq 15$;
$2 \leq SrO \leq 12$;
$2 \leq BaO \leq 12$; and
$4 \leq CaO+SrO+BaO \leq 20$.

2. The mother glass composition for graded index lenses as claimed in claim 1, wherein the content of $Li_2O$ is 2 mol % or more and less than 12 mol % and the total content of $Li_2O$ and $Na_2O$ is 6 mol % or more and less than 32 mol %.

3. The mother glass composition for graded index lenses as claimed in claim 1, wherein the glass components comprise in mol %:
$0 \leq B_2O_3 \leq 20$,
$2 \leq MgO \leq 22$,
$6 \leq MgO+CaO+BaO \leq 47$,
$2 \leq Li_2O < 12$,
$2 \leq Na_2O \leq 15$,
$6 \leq Li_2O+Na_2O < 27$,
$41 \leq SiO_2+TiO_2+B_2O_3+Al_2O_3 \leq 70$,
$0 \leq ZnO \leq 10$,
$0 \leq Y_2O_3 \leq 5$,
$0 \leq ZrO_2 \leq 2$, and
$0 \leq ZnO+Y_2O_3+Nb_2O_5+In_2O_3+La_2O_3+Ta_2O_5 \leq 15$.

4. The mother glass composition for graded index lenses as claimed in claim 1, wherein the glass components comprise in mol %:
$0 \leq B_2O_3 \leq 10$,
$2 \leq MgO \leq 16$,
$6 \leq MgO+CaO+SrO+BaO \leq 36$
$5 \leq Li_2O < 12$,
$5 \leq Na_2O \leq 15$,
$10 Li_2O+Na_2O < 27$,
$0 \leq K_2O \leq 3$,
$0 \leq Cs_2O \leq 3$,
$0.7 \leq Li_2O/Na_2O \leq 2$,
$50 \leq SiO_2+TiO_2+B_2O_3+Al_2O_3 \leq 70$,
$0 \leq ZnO \leq 8$,
$0 \leq Y_2O_3 \leq 5$,
$0.2 \leq ZrO_2 \leq 2$, and
$0.2 ZnO+Y_2O_3+ZrO_2+In_2O_3+La_2O_3+Ta_3O_5 \leq 10$.

5. The mother glass composition for graded index lenses as claimed in claim 1, wherein the glass components comprise in mol %:
$2 \leq TiO_2 8$,
$0 \leq b_2O_3 \leq 10$,
$2 \leq MgO \leq 16$,
$6 \leq MgO+CaO+SrO+BaO \leq 36$, $5 \leq Li_2O < 12$,
$5 \leq Na_2O \leq 15$
$10 \leq Li_2O + Na_2O < 27$,
$0 \leq K_2O \leq 3$,
$0 \leq Cs_2O \leq 3$,
$0.7 \leq Li_2O/Na_2O \leq 2$,
$50 \leq SiO_2 + TiO_2 + B_2O_3 + Al_2O_3 \leq 70$,
$0 \leq ZnO \leq 8$,
$0 \leq Y_2O_3 \leq 5$,
$0.2 \leq ZrO_2 \leq 2$, and
$0.2 \leq ZnO + Y_2O_3 + ZrO_2 + Nb_2O_5 + In_2O_3 + La_2O_3 + Ta_2O_5 \leq 10$.

6. The mother glass composition for graded index lenses as claimed in claim 3, wherein the content of $B_2O_3$ is from 1 to 10 mol %.

7. The mother glass composition for graded index lenses as claimed in claim 1, wherein any two or more of CaO/(CaO+SrO+BaO), SrO/(CaO+SrO+BaO) and BaO/(CaO +SrO+BaO) are 0.1 or more.

8. The mother glass composition for graded index lenses as claimed in claim 1, wherein any two or more of CaO/(CaO+SrG+BaO), SrO/(CaO+SrO+BaO) and BaO/(CaO+SrG+BaO) are 0.2 or more.

9. A graded index lens, wherein a refractive index distribution is formed by ion-exchange process, and the graded index lens comprises the glass components as claimed in claim 1.

10. A manufacturing method of a graded index lens, which comprises: immersing a glass rod containing a first alkali metal in a molten salt containing a second alkali metal that is different from the first alkali metal; and ion-exchanging the first alkali ion for the second alkali ion to thereby form a refractive index distribution in the glass rod, wherein the glass rod comprises the glass components as claimed in claim 1.

11. The graded index lens as claimed in claim 9, wherein a means for exclusion of a noise light is provided.

12. An optical product comprising the graded index lens as claimed in claim 9.

13. An optical instrument comprising the optical product as claimed in claim 12.

* * * * *